July 8, 1924.

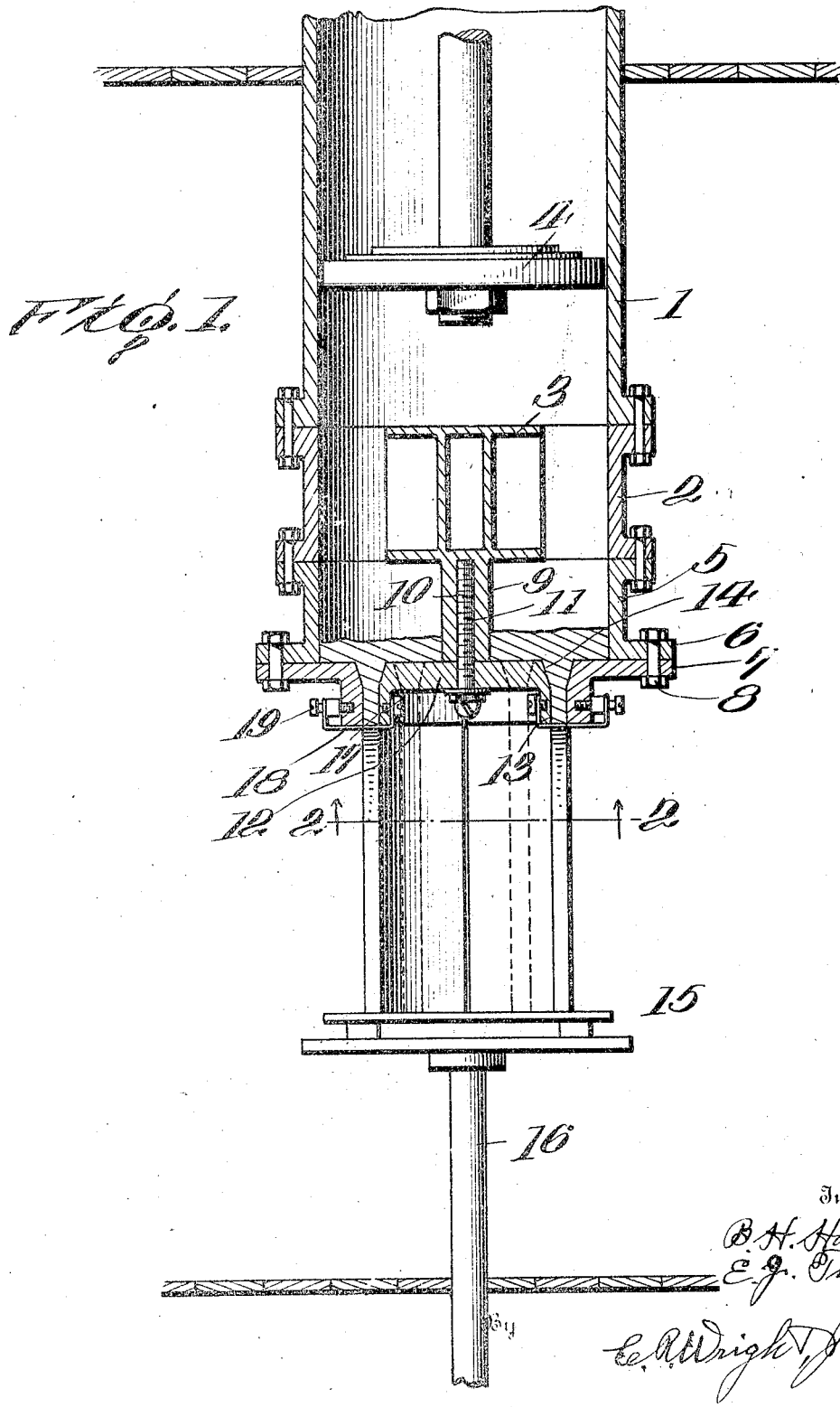

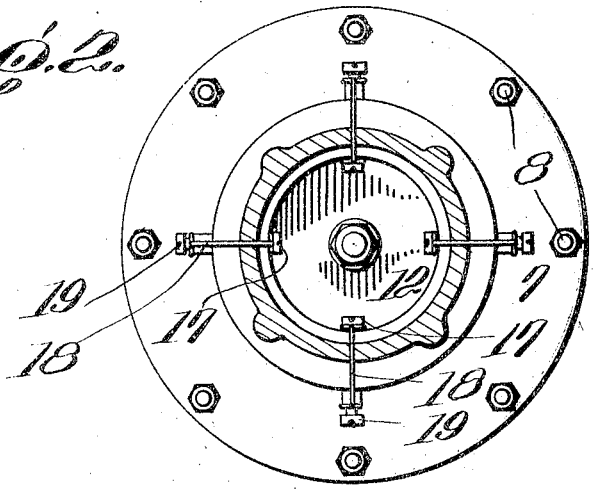
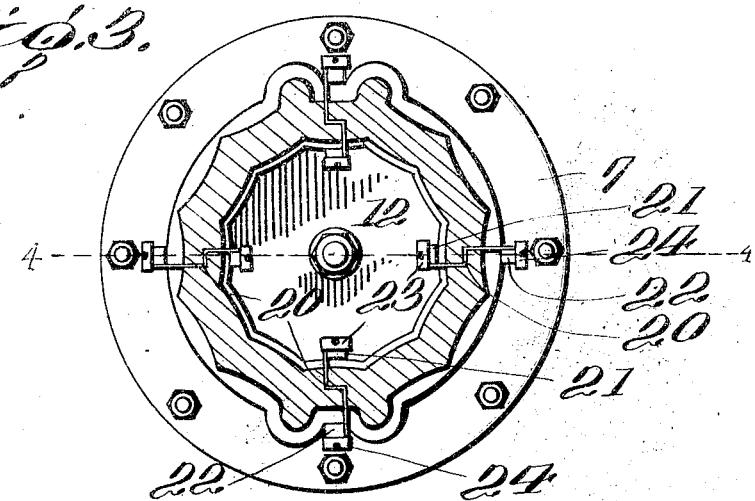
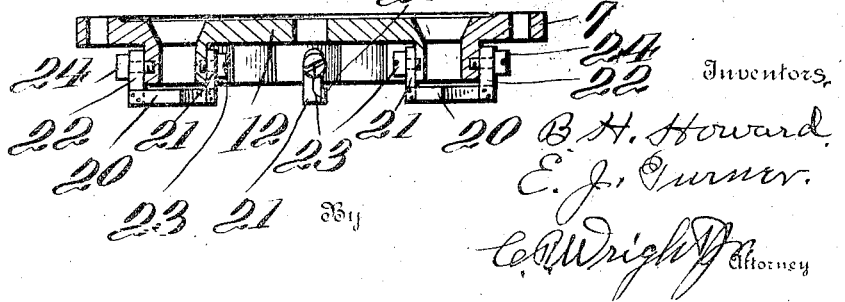

B. H. HOWARD ET AL 1,500,738

METHOD AND APPARATUS FOR MAKING SECTIONAL INGOT MOLD FEEDERS

Filed Dec. 29, 1923   3 Sheets-Sheet

Inventors

B. H. Howard
E. J. Turner

By C. R. Wright Jr. Attorney

Patented July 8, 1924.

1,500,738

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

METHOD AND APPARATUS FOR MAKING SECTIONAL INGOT-MOLD FEEDERS.

Application filed December 29, 1923. Serial No. 683,503.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Methods and Apparatus for Making Sectional Ingot-Mold Feeders, of which the following is a specification.

Our invention relates to improvements in the method and die for making sectional ingot mold feeders.

The object of our invention is to provide a method and apparatus whereby a hot top feeder may be formed of plastic material by a die, and severed into any desired number of sections to afterward be assembled as a single unit.

Another object of our invention is to provide a method and apparatus of this character which is continuous in its operation and in which the hot top feeder can be so severed that there will be an interlocking between the severed sections so that when they are assembled they will be held against lateral movement to prevent the collapsing of the feeder.

A still further object of our invention is to provide a method and apparatus whereby the hot top feeder may be made of any desired form and at the same time provide a simple, cheap and effective method and apparatus having certain details of structure and combination of parts hereinafter more fully described.

In the accompanying drawings,

Figure 1 is a vertical sectional view of a cylinder showing our improved method and die for forming a sectional hot top feeder.

Figure 2 is a transverse horizontal sectional view taken on the line 2—2 of Figure 1.

Figure 3 is a transverse horizontal sectional view taken on the same line as Figure 2 but showing a different form of cutter to form an interlocking connection between the severed sections.

Figure 4 is a vertical sectional view taken on the line 4—4 of Figure 3.

Figure 5:
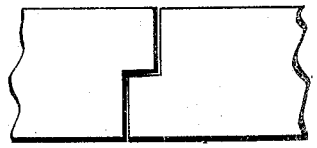
Figures 5, 6, 7, 8, 9, 10, 11, 12 and 13 show a few of the numerous cuts made by the different shaped cutters whereby an interlocking connection is formed between the severed sections.

Referring now to the drawings 1 represents the cylinder which has secured to its lower end the member 2 carrying a spreader 3 which is adapted to spread and break up the plastic material as it is forced through by the plunger 4. The plastic material may be fed into the cylinder in any desired manner, and the pressure employed by the piston forces the plastic material down around the spreader 3. Secured to the member 2 is a similar member 5 having at its lower end an outwardly extending flange 6 to which is secured the outer member 7 of the die. This member 7 as shown is secured to the flange 6 by means of bolts 8. The spreader 3 is provided at its center with a downwardly extending member 9 having an interior screw thread 10 into which is screwed the screw 11 which firmly clamps the inner die member 12 to the lower end of the member in its proper spaced relation to the other member 7 of the die.

The members 7 and 11 as shown in Figure 1 of the drawings form an annular passage 13, the upper end of which is slightly flared so as to form a large passage into which the plastic material is forced and owing to the contracting walls formed by the flare the plastic material is gradually compressed by the downward movement of the plunger, and passes from the lower end of the die in a solid compact form corresponding to the shape of the opening within the die. Below the lower end of the cylinder is a support 15 carried by the rod 16 which may be moved upwardly by any desired means and upon which rests the lower end of the hot top feeder as it is forced from the die.

In operation the member 15 is raised and the plunger 4 forced downwardly forcing the plastic material through the die and forming the hot top feeder. As the plunger travels downwardly the support 15 is moved downwardly and so timed that the hot top feeder is supported thereby. After a hot top feeder of the desired length has been formed the apparatus is stopped and the hot top feeder severed close to the die and removed from the support 15. The support 15 is then again raised to support the lower end of that portion of the hot top feeder being formed.

In order to sever the hot top feeder into several sections the inner wall of the member 12 of the die has secured thereto by means of a screw 17 a piano wire 18 which extends across the space 13 between the inner die member 12 and the outer die member 7. The opposite end of the wire 18, is secured to a screw 19 which is screwed into the outer wall of the die member 7. By turning the screw member 19 it will be seen that the piano wire 18 is tightly drawn across the space between the two die members so as to more accurately sever the hot top feeder as it is forced from the die. While we have shown and described this form of fastening and tightening the piano wire below the lower end of the die it will be understood that this could be accomplished in many ways and do not care to limit ourselves to the specific structure shown. The hot top feeder as heretofore described is forced by pressure from the die and the wires 18 sever it in a transverse line so that in reality the hot top feeder is cut or formed in any desired number of sections and to be afterwards assembled to form a single unit.

Figure 6:
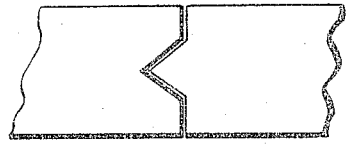
Figure 7:
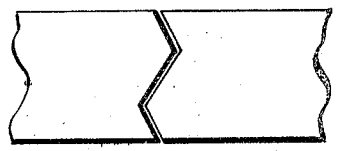
Figure 8:
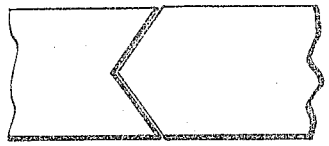
Figure 9:
Figure 10:
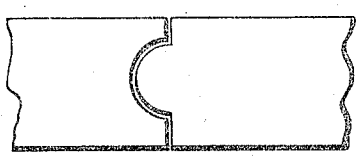
Figure 11:
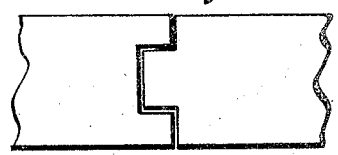
Figure 12:
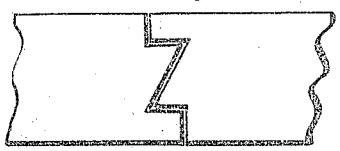
Figure 13:
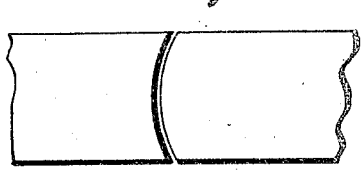
Figure 14:
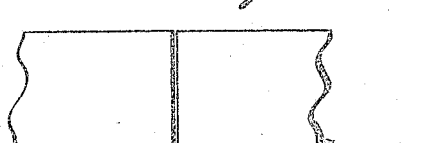
Figure 14 shows a cut such as would take place by the construction shown in Figures 1 and 2 of the drawings.

In Figures 3 and 4 of the drawings, instead of having a piano wire for severing the hot top feeder into a number of sections, we have employed saw blades arranged whereby the cuts may be of any desired form such as shown in Figures 5 to 13 inclusive. This is accomplished by having the saw blades 20 which have rigidly secured to their outer ends, the vertically disposed plates 21 and 22. The plate 21 is secured to the wall of the die member 12 by means of a screw 23. The plate 22 is secured to the die member 7 by means of a screw 24, all of which is fully shown in Figure 4 of the drawings. By this structure it will be seen that the saw blades as heretofore described can be made of any desired shape so that any of the shapes cut such as shown in Figures 5 to 13 inclusive may be made while severing the hot top feeder and whereby an interlocking joint is formed between the sections, which are later assembled to form a single unit. This operation forms a joint that holds the sections together, yet allows the ready separation of the sections when removed from the supporting table 15. It will also be understood that the applicants do not desire to limit themselves to the specific means of saw blades and means of attaching them to the die members but the same could be modified in numerous ways.

Having thus fully described our invention what we claim is:

1. A method of forming sectional hot top feeders consisting in forcing the plastic material through a die and severing it into longitudinal sections as it passes from the die.

2. The method of forming a hot top feeder consisting of forcing plastic material through a correspondingly shaped die and severing the same into several longitudinal sections as it passes from the die to form a series of sections.

3. A die for forming sectional hot top feeders consisting of a member having an annular passage through which plastic material is forced and cutting means arranged at the lower end of the die for severing same into several longitudinal sections.

4. A die for forming sectional hot top feeders consisting of a member having an annular passage therethrough, through which plastic material is forced by pressure and cutting means adjustably secured to the die and extending across the lower end of the annular passage.

5. A die for forming sectional hot top feeders comprising a member having an annular contracted passage therethrough and cutting means supported by the member and extending across the lower end of the annular passage.

6. A die for forming sectional hot top feeders comprising a member having an annular passage therethrough and cutting means carried by the die and extending across the lower end of the annular passage and shaped to form an interlocking connection between the severed sections.

7. A die for forming a sectional hot top feeder comprising a member having a contracted annular passage through which plastic member is forced and cutters arranged below the lower end of the annular passage for severing the hot top feeder into a series of longitudinal sections.

8. A die forming hot top feeders comprising a member having a contracted passage through which plastic material is forced and cutters removably carried by the die and extending across the lower end of the annular passage and of a shape to form an interlocking connection to sever same as it passes from the annular passage.

9. An apparatus for forming sectional hot top feeders comprising a cylinder, a spreader therein, a die member secured to the lower end of the cylinder, a second die member secured to the spreader and spaced from the first die member, forming a contracted annular passage between the same and cutters carried by the lower ends of the die members and extending across the lower end of the annular passage.

10. An apparatus for forming sectional hot top feeders comprising a cylinder, a piston therein, a spreader supported by the cylinder, a die member supported by the lower end of the cylinder, a second die member supported by the spreader and spaced from the first die member and adapted to form a contracted annular passage between the die members, a cutter carried by the die members and extending across the lower end of the passage and of a shape to form an interlocking connection between the severed sections.

In testimony whereof we affix our signatures.

BLOOMFIELD H. HOWARD.
ERNEST J. TURNER.